United States Patent
Shinozaki et al.

(10) Patent No.: US 6,879,670 B2
(45) Date of Patent: Apr. 12, 2005

(54) COLLECTIVE HOUSING INTERCOM APPARATUS

(75) Inventors: Tatsuru Shinozaki, Nagoya (JP); Hiroshi Sumiya, Nagoya (JP)

(73) Assignee: Aiphone Co., Ltd. (JP)

( * ) Notice: Subject to any disclaimer, the term of this patent is extended or adjusted under 35 U.S.C. 154(b) by 0 days.

(21) Appl. No.: 10/310,864

(22) Filed: Dec. 6, 2002

(65) Prior Publication Data

US 2003/0185367 A1 Oct. 2, 2003

(30) Foreign Application Priority Data

Mar. 27, 2002 (JP) ........................................ 2002-089485

(51) Int. Cl.⁷ .............................................. H04M 1/60
(52) U.S. Cl. ............. 379/167.01; 379/159; 379/167.02; 379/167.07; 379/167.12; 379/171
(58) Field of Search ................................ 379/156, 159, 379/160, 167.01, 167.04, 167.05, 167.08, 167.12, 167.02, 167.07, 171; 340/326, 330, 391.1

(56) References Cited

U.S. PATENT DOCUMENTS

| 5,191,423 A | * | 3/1993 | Yoshida ........................ 725/57 |
| 5,568,542 A | * | 10/1996 | Borshchevsky et al. .... 379/171 |
| 5,774,039 A | * | 6/1998 | Housley ...................... 340/326 |
| 6,058,174 A | * | 5/2000 | Borshchevsky ........ 379/167.02 |

* cited by examiner

Primary Examiner—Binh Tieu
(74) Attorney, Agent, or Firm—Lorusso, Loud & Kelly (57) ABSTRACT

The invention makes it possible to call a resident of collective housing even when the apartment number of the resident is unknown. A collective housing entrance substation is connected to residential master stations through a controller, and a name retrieval module is connected to the controller. The name retrieval module has a memory in which a name and/or apartment number of a resident is registered in advance, a button operable to display the name and/or apartment number of the resident registered in advance, a name indicator for display of the name and/or apartment number of the resident registered in advance, and a call button that is operated with display of the proper name and/or apartment number to call the residential master station of the resident.

6 Claims, 5 Drawing Sheets

RELATED ART

COLLECTIVE HOUSING INTERCOM APPARATUS

BACKGROUND OF THE INVENTION

1. Field of the Invention

The present invention relates to a collective housing intercom apparatus and, particularly, to a collective housing intercom apparatus with which a resident in the collective housing can be called even when the room number of the resident is unknown.

2. Description of the Related Art

Figure 5:
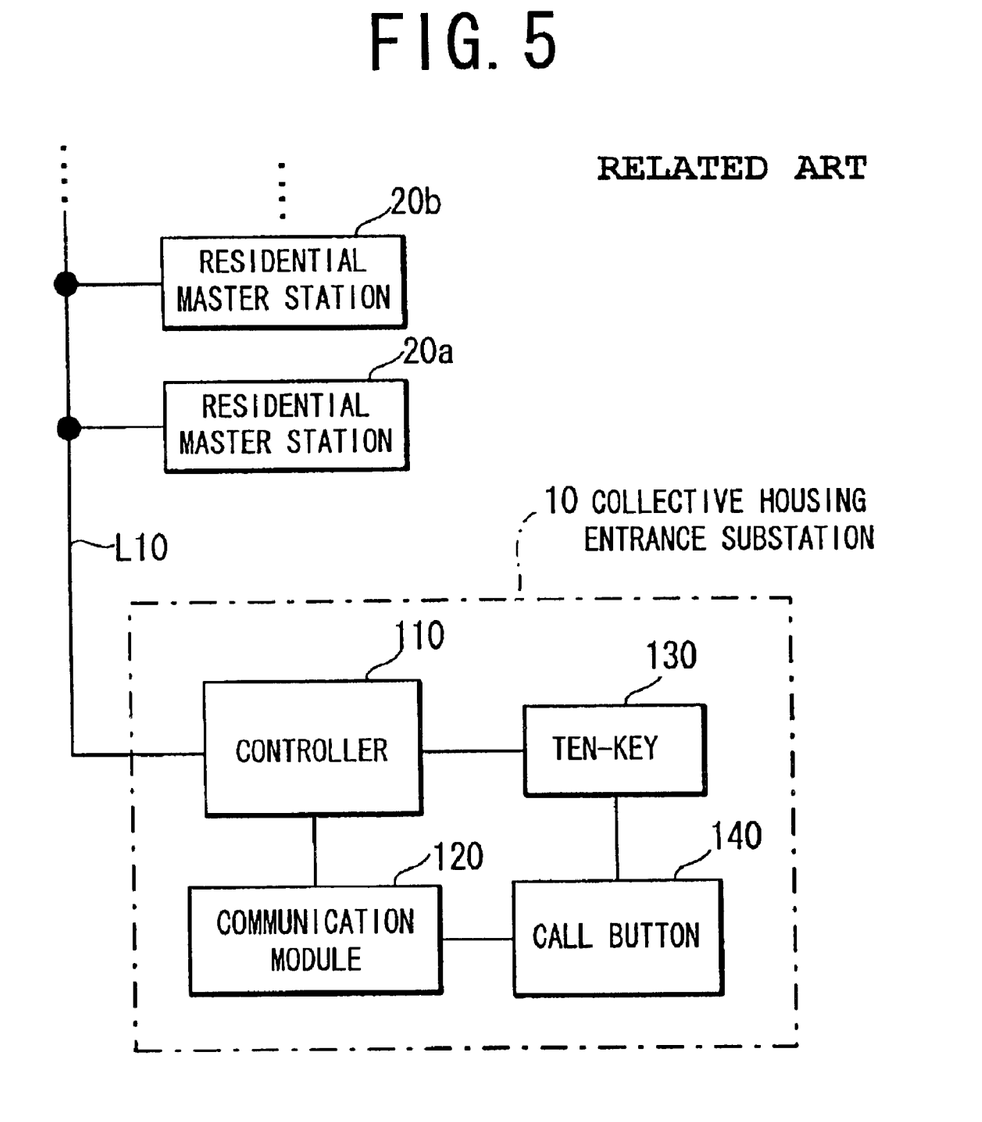
FIG. 5 is a block diagram showing a collective housing intercom apparatus according to the related art.

Apparatus as shown in FIG. 5 is a conventional intercom system for collective housing. FIG. 5, shows a related rights collective housing intercom apparatus as including a collective housing entrance substation 10, installed in a common (shared) area of the collective housing, and residential master stations 20a, 20b, . . . installed in respective apartments of residents in the collective housing.

The collective housing entrance substation 10 has a controller 10 for controlling each component (circuit), a communication module 120 for communication with a resident, ten keys 130 for inputting an apartment number of a resident, and a call button 140 for calling the residential master station of a resident. The communication module 120, the ten keys 130, and the call button 140 are connected to the controller 110, and each of the residential master stations 20a, 20b, . . . is connected to the controller 10 through a transmission line L10.

Operation of the collective housing intercom apparatus shown in FIG. 5 will now be described.

When a visitor inputs an apartment number of a resident (hereinafter referred to as a resident") having, in his/her apartment, a residential master station 20a (hereinafter referred to as a "first residential master station 20a"), for example, by using the ten keys 130 of the collective housing entrance substation 10 and depressing the call button 140 to call the resident. A call signal including the address of the first residential master station 20a is thereby output from the controller 110, and the call signal is transmitted to the first residential master station 20a through the transmission line L10.

At the first residential master station 20a a call-up tone sounds from a residential speaker (not shown) and a ringing tone sounds from an entrance substation speaker (not shown) of the collective housing entrance substation 10.

When a handset (not shown) of the first residential master station 20a is lifted, communication is established between the first residential master station 20a and the collective housing entrance substation 10.

However, the collective housing intercom having such a structure has problems in that a resident in the collective housing cannot be called when the apartment number of the resident is unknown and in that the wrong resident can be called by a mistake in depressing the ten keys.

SUMMARY OF THE INVENTION

The objectives of the present invention are to solve the above problems, and to provide a collective housing intercom system with which a resident of collective housing can be called even when the apartment number of the resident is unknown and which eliminates the possibility of calling the wrong resident.

Accordingly, the present invention provides a collective housing intercom system including a collective housing entrance substation, a residential master station connected thereto through a controller thereof, and a name retrieval module connected to the controller. The name retrieval module has a memory in which names and/or room numbers of residents are registered in advance, a button operable to display a registered name and/or room number of the resident, a name indicator for displaying the registered name and/or room number of the resident, and a call button that is operated with the display of the registered name and/or room number of the resident displayed to call the residential master station of the resident.

A collective housing intercom apparatus according to the invention may have a ten-key module for retrieving from the memory a name and/or room number of a resident to be called and for registering or changing the name and/or room number of the resident in the memory.

A collective housing intercom apparatus according to the invention may have a control circuit for inputting the initial letter of a name of a resident to be retrieved from the memory, using the ten-key module, for retrieving the name of the resident directly, and for displaying the same on the name indicator.

A collective housing intercom apparatus according to the invention may include a personal computer for registering and changing a name and/or room number of a resident in the memory.

The personal computer of a collective housing intercom apparatus according to the invention may have a computer memory containing pre-installed dedicated software for storing a name and/or room number of a resident in advance and for transferring it to the memory for registration or alteration.

In using the collective housing intercom apparatus of the present invention, since a name of a resident registered in advance can be displayed on the name indicator of the collective housing entrance substation, a resident can be called even when the apartment number of the resident to be called is unknown, if the name of the resident is known. Since the name of a resident to be called is displayed on the indicator and the resident can be called while confirming the display, there is no possibility of calling the wrong resident by inputting an incorrect apartment number.

DETAILED DESCRIPTION OF THE PREFERRED EMBODIMENTS

A preferred embodiment of a collective housing intercom apparatus according to the invention will now be described with reference to the drawings.

Figure 1:
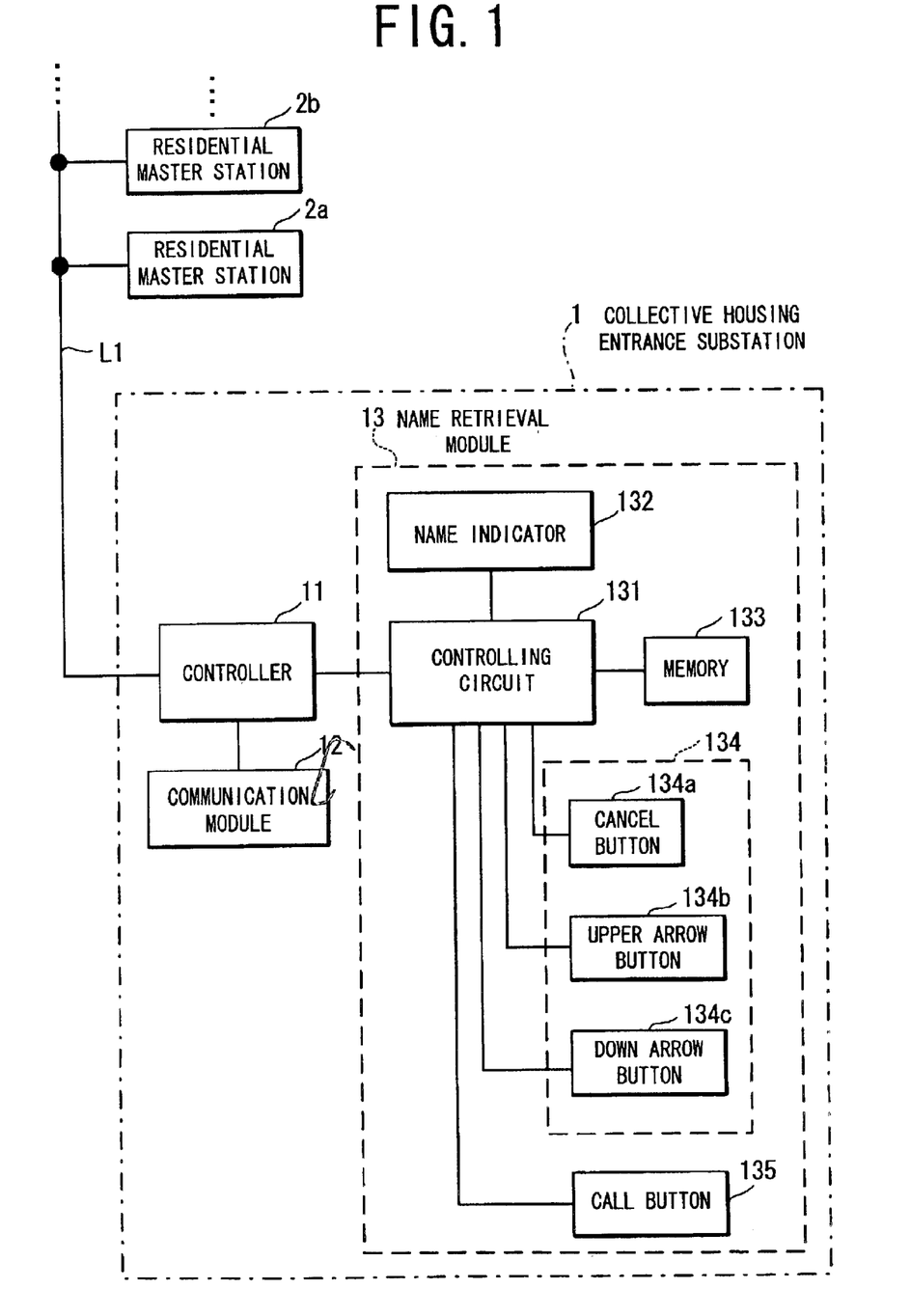
FIG. 1 is a block diagram showing an embodiment of a collective housing intercom apparatus according to the invention.

FIG. 1 is a block diagram of an embodiment of a collective housing intercom apparatus of the present invention which includes a collective housing entrance substation 1 installed in a shared (common) area of the collective housing and residential master stations 2a, 2b, . . . installed in each of the apartments (living quarters) of the collective housing. Each of the residential master stations 2a, 2b, . . . is connected to the collective housing entrance substation 1 through a transmission line L1.

The collective housing entrance substation 1 has a controller 11 for controlling each circuit, a communication module 12 for communication with a resident, and a name retrieval module 13 for retrieving a name and/or room (apartment) number of a resident. The name retrieval module 13 has a control circuit 131 for retrieving a name of a resident, a name indicator 132 for display of a name and/or apartment number of a resident, a memory 133 in which names and/or apartment numbers of residents are registered in advance, buttons 134 operated to display a name and/or apartment number of a resident (hereinafter referred to as "operation buttons 134"), and a call button 135 for calling the residential master station of a resident. The operation buttons 134 include a cancel button 134a, an up arrow button 134b, and a down arrow button 134c.

The controller 11 is connected to the transmission line L1, the communication module 12, and the control circuit 131 of the name retrieval module 13. The name indicator 132, the memory 133, the call button 135, and the cancel button 134a, the up arrow button 134b, and the down-arrow-button 134c (operation buttons 134-"input means") are connected to the control circuit 131.

Operation of the collective housing intercom apparatus according to the invention will now be described.

When the up arrow button 134b or down arrow button 134c is first depressed to call a resident of collective housing, e.g., the resident (hereinafter referred to as a "first resident") who has the residential master station 2a (hereinafter referred to as a "first residential master station 2a") in his/her apartment, the name and room (apartment) number of the resident are read from the memory 133 under the control of the control circuit 131, and the name and apartment number of the resident are displayed on the name indicator 132. When the up arrow button 134b or the down arrow button 134c is further depressed to scroll the display screen of the name indicator 132, the name and apartment number of the first resident appear on the name indicator 132.

When the call button 135 is depressed with the name and apartment number of the first resident displayed on the name indicator 132, call information for calling the first residential master station 2a is transmitted from the control circuit 131 to the controller 11. When such call information is received by the controller 11, a call signal including address of the first residential master station 2a is output from the controller 11, and the call signal is transmitted to the first residential master station 2a through the transmission line L1.

This puts the first residential master station 2a in a call state in which a call-up tone sounds from a residential speaker (not shown) and a ringing tone sounds from a entrance substation speaker (not shown) of the collective housing entrance substation 1.

When a handset (not-shown) of the first residential master station 2a is lifted, communication is established between the first residential master station 2a and the collective housing entrance substation 1.

While "names and apartment numbers of residents" are registered in the memory 133 in the above embodiment, the contents registered in the memory 133 may be changed to "names of residents" only or to "apartment numbers of residents" only, through an operation of a setting button (not shown) of the control circuit 131.

In the above embodiment, the first resident can be called even when the apartment number of the first resident is unknown, if the name of the first resident is known.

Figure 2:
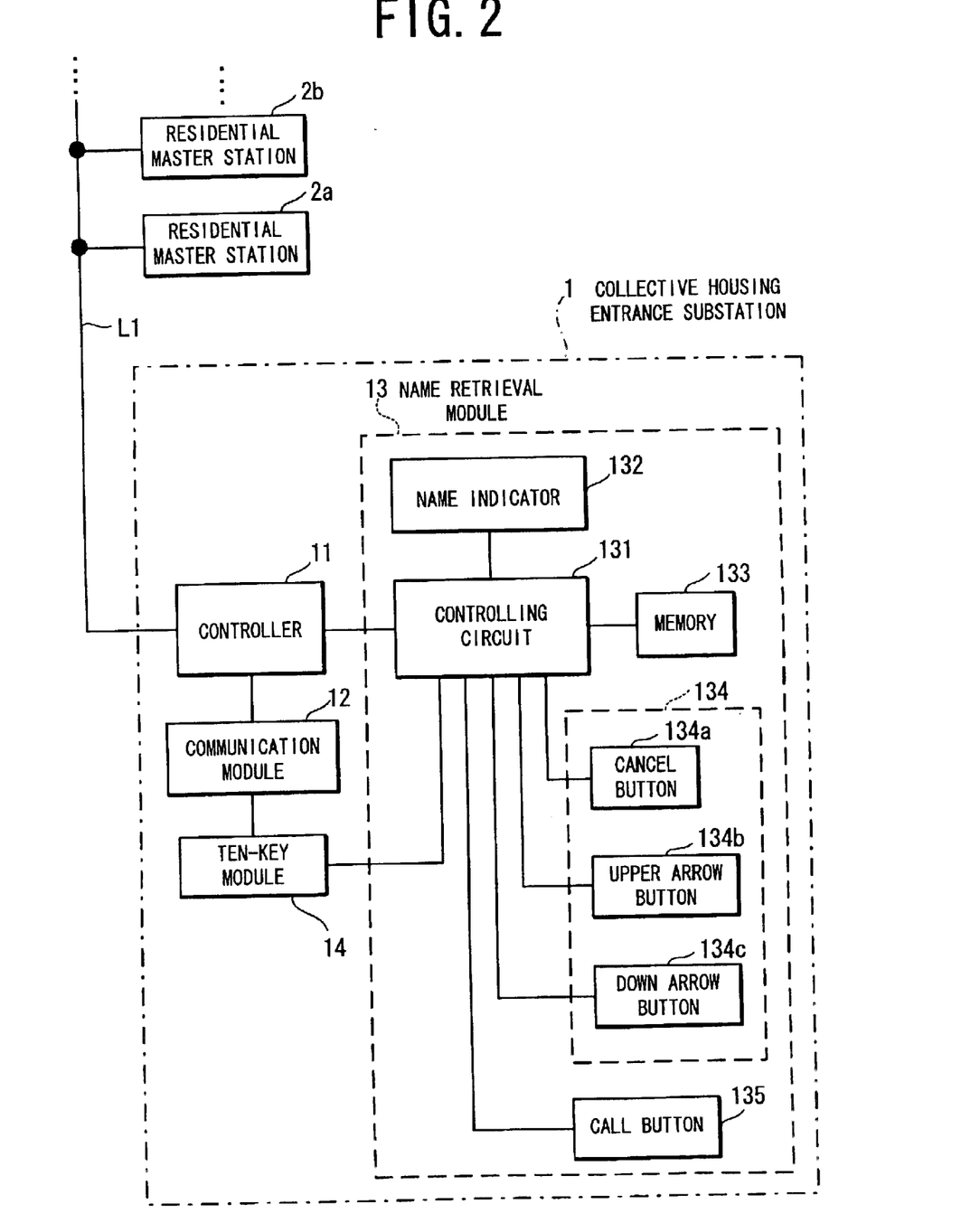
FIG. 2 is a block diagram showing another embodiment of a collective housing intercom apparatus according to the invention.

FIG. 2 shows another embodiment of a collective housing intercom apparatus of the present invention. In FIG. 2, components that also appear in FIG. 1 are indicated by like reference numerals and will not be again described in detail.

In the present embodiment, a ten-key module 14 is further connected to the control circuit 131 of the collective housing entrance substation 1 as shown in FIG. 1.

Figure 3:
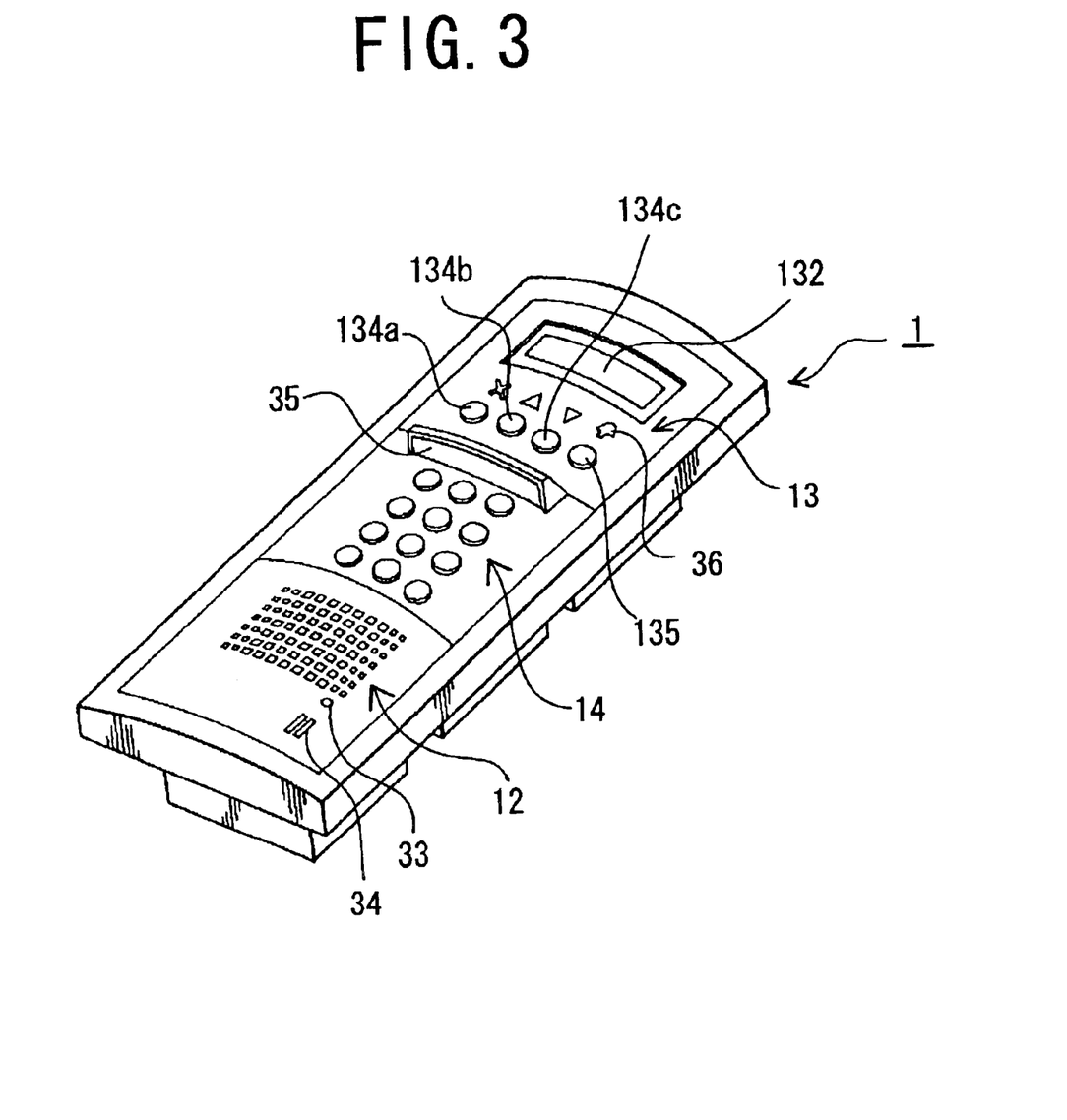
FIG. 3 is a perspective view showing an embodiment of the collective housing entrance substation shown in FIG. 2.

FIG. 3 is a perspective view of the collective housing entrance substation 1 shown in FIG. 2. In FIG. 3, components that also appear in FIG. 2 are indicated by like reference numerals.

In FIG. 3, the name retrieval module 13, the ten key module 14, and a communication module 12, that constitute the collective housing entrance substation 1, are arranged in line. Disposed on top is the name retrieval module 13 that has a name indicator 132, four pictorial symbols 36, a cancel button 134a, an up arrow button 134b, a down arrow button 134c, and a call button 135. In this embodiment the "input means" further includes, disposed in the middle of the substation 1, a ten-key registration module 14 ("alphabet letter input means") that has a multiplicity of keys 31 and a light source 35, constituted by an LED, for illuminating the keys 31. Disposed at the bottom of the substation 1 is the communication module 12 that has a speaker grill 32, a communication indicator lamp 33, and a microphone grill 34.

Operation of collective housing intercom apparatus shown in FIGS. 2 and 3 will now be described.

First, registration (addition or changing) of a name and an apartment number of a resident in the memory 133 will be described.

A secret code is first input using the keys 31 of the ten-key registration module 14 to display a menu screen on the name indicator 132 of the name retrieval module 13. Then, the up arrow button 134b or the down arrow button 134c is depressed to switch the menu screen to a screen for inputting a name. Groups of letters are assigned to the keys 31 forming a part of the ten-key registration module 14, and a name of a first resident is input by operating those keys to register the name of the first resident in the memory 133. Thereafter, names of other residents are sequentially registered in the memory 133 through similar operations.

Next, when the names of the residents are registered, the setting button (not shown) of the controller 11 is depressed to put the system of the collective housing intercom apparatus in a "setting mode". In the setting mode, the name of the first resident is displayed on the name indicator 132.

When an operator stationed at the first residential master station 2a in advance lifts up the handset, communication is established between the first residential master 2a and the collective housing entrance substation 1. A conversation is then held between the operator stationed at the residential master station 2a and another operator stationed at the collective housing entrance substation 1, and the call button 135 is depressed after confirming the name of the first resident and the apartment number of the first residential master station 2a displayed on the name indicator 132. The name and the apartment number of the resident can be thus set. Thereafter, the names and apartment numbers of the other residents are set through similar operations.

Calling the first resident ("calling mode") using the keys 31 of the collective housing entrance substation 1 will now be described. In the present embodiment, the letter "S", is assigned to an n-th key among the keys 31 (the n-th key is hereinafter referred to as an "S key"). It is assumed that the name of the first resident is "SAITO".

When a visitor knows that the name of the first resident is "SAITO", although the apartment number of the first resident is unknown, the visitor depresses the S key, selected from among the keys 31 of the collective housing entrance substation 1. Then, names of residents such as "SAITO", "SATO", and "SUZUKI" to which the letter "S" is assigned and room numbers associated with the residents are sequentially read from the memory 133 under the control of the control circuit 131, and the resident's name "SAITO" that is first in the alphabetical order is displayed on the name indicator 132 along with the apartment number. When the display screen of the name indicator 132 is scrolled, the names such as "SAITO" and "SUZUKI" are sequentially displayed along with the apartment numbers.

When the call button 135 is depressed with the first resident "SAITO" displayed on the name indicator 132 and thus selected, a call signal including address of the first residential master station 2a is output from the controller 11 in the same way as in the first embodiment, and the call signal is transmitted to the first residential master station 2a through the transmission line L1. Similarly to the first embodiment, this puts the first residential master station 2a in a called state and thereafter the handset of the first residential master station 2a is lifted. Thus, communication is established between the first residential master station 2a and the collective housing entrance substation 1.

The above-described second embodiment also eliminates the possibility of calling the wrong resident because the intended resident can be called with that resident's name and apartment number displayed on the name indicator to confirm the name of the resident. In the second embodiment, a resident to be called can be retrieved in accordance with the first letter of the name of the resident without scrolling the display screen of the name indicator until the intended resident is displayed as in the above-described first embodiment. This provides better operability than the first embodiment, and the advantage becomes more significant when the invention is used in an intercom system for collective housing of a large scale.

While a name of a resident is retrieved by depressing a key to which a letter is assigned in the second embodiment, name of a resident may be retrieved by using the call button the name retrieval module or by using the ten-key module and an operation button in combination. Further, when the apartment number of a resident is known, the apartment number may be input using the keys to call the resident in the same way as that of a collective housing intercom apparatus according to the related art.

Figure 4:
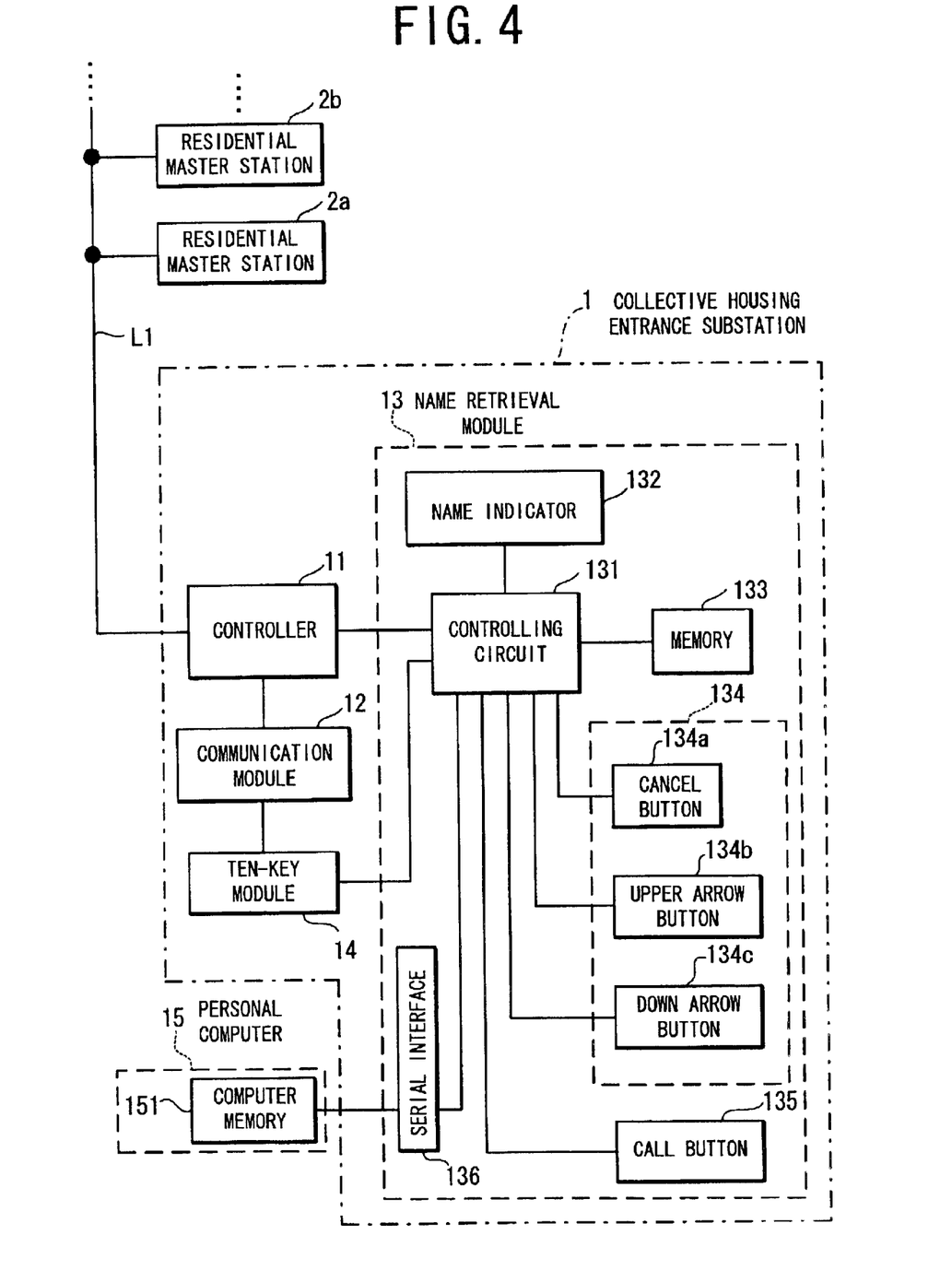
FIG. 4 is a block diagram showing still another of a collective housing intercom apparatus according to the invention.

FIG. 4 shows another embodiment of a collective housing intercom apparatus according to the present invention. In FIG. 4, components that appear also in FIGS. 1 to 3 are indicated by like reference numerals and will not be described in detail.

In the present embodiment, a personal computer 15 is further connected to a control circuit 131 of a collective housing entrance substation 1, as shown in FIG. 2, through a serial interface 136. The personal computer 15 has a computer memory 151 in which names and/or apartment numbers of residents are stored in advance using pre-installed dedicated software, and the computer memory 151 is connected to the serial interface 136.

In the present embodiment, the registered names and/or apartment numbers stored in the computer memory 151 can be transferred to the memory 133 through the serial interface 136 and the control circuit 131 by means of operation of the key-board (not shown) of the personal computer 15, which makes it possible to register the names and apartment numbers of the residents in the memory 133 in the same way as in the second embodiment. The names of the residents may be registered using letters assigned to the keys 31 in the same manner as in the second embodiment.

In the third embodiment described above, the name "SAITO" of the first resident can be displayed on the name indicator 132 in the same way as in the second embodiment, and the first resident can be called after confirming the content of the display. In the present embodiment, since the personal computer 15 is connected to the control circuit 131 of the name retrieval module 13 through the serial interface 136, any computer having a serial interface may be used if the software is installed, and the names of the residents can be registered using a compact hand-held computer, for example.

While the registration of names of residents has been described in the above embodiments, names of residents can be changed through an operation similar to the registration of names of residents. While letters are assigned to the keys in the above embodiments, names of residents may be input by assigning characters of another language to the keys or by assigning letters and the characters in combination.

As apparent from the above description, with a collective housing intercom apparatus according to the present invention, since a name of a resident registered in advance can be displayed on a name indicator of a collective housing entrance substation, the resident can be called even when the apartment number of the resident to be called is unknown, provided the name of the resident is known. Further, since the name of the resident to be called can be displayed on the name indicator to allow the resident to be called while being confirmed on the display, there is no possibility of calling the wrong resident by input of an incorrect apartment number.

What is claimed is:

1. A collective housing intercom apparatus comprising:

plural residential master stations respectively located in apartments of different residents;

a controller;

a collective housing entrance substation, connection to said plural residential master stations through said controller and including a name retrieval module, said name retrieval module comprising:

a memory containing, registered therein, names of the different residents;

input means for selecting a name of a resident registered in said memory, including an initial letter of the alphabet input means for input of the initial letter of a resident name;

a name display, changeable responsive to said inputting, to selectively display the selected resident name; and calling means, operable with the display of the selected resident name, for calling the residential master station in the apartment of the resident having the selected resident name.

2. The collective housing intercom apparatus of claim 1 wherein said letter of the alphabet input means is a keypad.

3. The collective housing intercom apparatus of claim 1 wherein said controller has a calling mode for said calling and a setting mode, and wherein said input means comprises a registration module for inputting resident names, for switching said controller between said calling and setting modes, for, in said setting mode, registering the input names in said memory, and for, in said calling mode, inputting at least the first letter of a resident name.

4. The collective housing intercom of claim 3 wherein said registration module is a keypad.

5. The collective housing intercom apparatus of claim 1, comprising a personal computer for registering and changing a resident name and/or apartment number in said memory.

6. The collective housing intercom apparatus of claim 5, the personal computer has a computer memory for storing a name and/or room number of a resident in advance using preinstalled dedicated software and for transferring it to said memory for registration or alteration.

* * * * *

UNITED STATES PATENT AND TRADEMARK OFFICE
CERTIFICATE OF CORRECTION

PATENT NO. : 6,879,670 B2
DATED : April 12, 2005
INVENTOR(S) : Shinozaki et al.

It is certified that error appears in the above-identified patent and that said Letters Patent is hereby corrected as shown below:

Column 6,
Line 43, change "connection" to -- connected --;

Column 8,
Line 1, after "claim 5" insert -- wherein --.

Signed and Sealed this

Twenty-eighth Day of March, 2006

JON W. DUDAS
*Director of the United States Patent and Trademark Office*